(12) United States Patent
Hite et al.

(10) Patent No.: US 6,959,405 B2
(45) Date of Patent: Oct. 25, 2005

(54) METHOD AND SYSTEM FOR CONCURRENT ERROR IDENTIFICATION IN RESOURCE SCHEDULING

(75) Inventors: Cheryl Hite, Redwood Shores, CA (US); Tyler Morse, Brisbane, CA (US); Ofer Matan, Palo Alto, CA (US); Tiffany Boehmer, Palo Alto, CA (US); Illah Nourbakhsh, Pittsburgh, PA (US); Serdar Uckun, Palo Alto, CA (US); Jason Fama, Mountain View, CA (US); Edward Reusser, Sunnyvale, CA (US); Gregory Fichtenholtz, Sunnyvale, CA (US); Simon Shvarts, Cupertino, CA (US)

(73) Assignee: Blue Pumpkin Software, Inc., Sunnyvale, CA (US)

( * ) Notice: Subject to any disclaimer, the term of this patent is extended or adjusted under 35 U.S.C. 154(b) by 708 days.

(21) Appl. No.: 09/837,251

(22) Filed: Apr. 18, 2001

(65) Prior Publication Data

US 2002/0157043 A1 Oct. 24, 2002

(51) Int. Cl.[7] ............................................... G06F 11/00
(52) U.S. Cl. .................. 714/57; 705/8; 705/9; 700/99; 700/100
(58) Field of Search ................. 705/8, 9; 700/99, 700/100; 714/57

(56) References Cited

U.S. PATENT DOCUMENTS

| | | | |
|---|---|---|---|
| 4,510,351 A | | 4/1985 | Costello et al. |
| 4,937,743 A | * | 6/1990 | Rassman et al. ................ 705/8 |
| 5,111,391 A | | 5/1992 | Fields et al. |
| 5,185,780 A | | 2/1993 | Leggett ........................ 379/34 |
| 5,195,172 A | | 3/1993 | Elad et al. |
| 5,289,368 A | | 2/1994 | Jordan et al. ................ 364/401 |

(Continued)

FOREIGN PATENT DOCUMENTS

| | | | |
|---|---|---|---|
| EP | 0 817 455 A2 | 1/1998 | |
| EP | 0 863 650 A2 | 9/1998 | |
| EP | 1 039 732 A2 | 9/2000 | |
| EP | 1 162 814 A2 | 12/2001 | |
| GB | 2 339 643 A | 2/2000 | |
| WO | WO 00/08556 | 2/2000 | ............. G06F/9/44 |

*Primary Examiner*—Robert Beausoliel
*Assistant Examiner*—Christopher McCarthy
(74) *Attorney, Agent, or Firm*—Courtney Staniford & Gregory LLP

(57) ABSTRACT

A method and system for handling real-time indications of resource scheduling conflicts. In one embodiment, the method includes a computer system including a user interface, display, processor, and some form of memory. Contained within the memory is a resource scheduling process that analyzes resource data, scheduling criteria, and work parameters to create a working schedule. In conjunction with the creation of a working schedule, the scheduling process detects resource conflicts that can inhibit the schedule's functionality. Once detected an identification process conveys the error to the user concurrently with the schedule process to provide the user with a real-time indication of resource conflicts. The indication is presented in an unobtrusive manner so as to not interfere or impede the scheduling process. In addition, should the specific resource causing the conflict be identifiable, the indication process conveys that information in a similar real-time methodology.

33 Claims, 9 Drawing Sheets

U.S. PATENT DOCUMENTS

| | | | |
|---|---|---|---|
| 5,325,292 A | 6/1994 | Crokett | 364/401 |
| 5,369,570 A | 11/1994 | Parad | |
| 5,477,447 A | 12/1995 | Luciw et al. | 364/419.08 |
| 5,481,667 A | 1/1996 | Bieniek et al. | 395/161 |
| 5,659,768 A | 8/1997 | Forbes et al. | |
| 5,917,485 A | 6/1999 | Spellman et al. | 345/336 |
| 6,021,403 A | 2/2000 | Horvitz et al. | 706/45 |
| 6,021,428 A | 2/2000 | Miloslavsky | |
| 6,044,355 A | 3/2000 | Crockett et al. | |
| 6,049,776 A * | 4/2000 | Donnelly et al. | 705/8 |
| 6,081,592 A | 6/2000 | Battle | |
| 6,167,379 A * | 12/2000 | Dean et al. | 705/9 |
| 6,381,580 B1 * | 4/2002 | Levinson | 705/8 |
| 6,647,448 B1 * | 11/2003 | Brelin | 710/107 |
| 6,732,080 B1 * | 5/2004 | Blants | 705/9 |
| 2002/0065700 A1 * | 5/2002 | Powell et al. | 705/9 |
| 2005/0091098 A1 * | 4/2005 | Brodersen et al. | 705/8 |

\* cited by examiner

METHOD AND SYSTEM FOR CONCURRENT ERROR IDENTIFICATION IN RESOURCE SCHEDULING

FIELD OF THE INVENTION

The invention is in the field of real-time error handling. More particularly this invention relates to the real-time handling of resource scheduling conflicts and resolution of those conflicts in a complex scheduling environment.

BACKGROUND OF THE INVENTION

Resource scheduling is a complex task that requires satisfaction of several potentially conflicting goals and constraints. In a complex environment a resource scheduling algorithm may reach its conclusion with several unfulfilled goals and exceptions. These unfulfilled goals frustrate the intended result of a working resource schedule. One such complex environment of resource scheduling is call center forecasting and agent scheduling. In this complex and diverse setting, a significant amount of configuration and parameter specifications must be done via user interfaces before a final result can be produced. Existing applications for resource scheduling do not adequately produce an unobtrusive interactive mechanism for warning the user of parameter or configuration selections that are likely to result in poor performance or failure of the schedule.

Current algorithms produce warnings or an indication of a conflict that interrupt the scheduling process. Present scheduling systems, known to one skilled in the art, use modal interfaces to detect and inform the user of errors. Errors that are detected in mid-stream of the user work forcibly interrupt the user with a warning message. This warning message prevents the user from continuing work without at least acknowledging its presence. These warning mechanisms are rigid in their application and, if disabled, are completely ineffective at providing any type of failure notification. For example, this warning process is accomplished through a series of programmed communications between the error detection program and the primary scheduling program that results in the scheduling operations ceasing.

The prior art fails to provide an unobtrusive or concurrent means to notify a user of a resource scheduling conflict. By forcing the user to interact with a warning or notification of a pending error, the efficiency of the scheduling process suffers. If the user elects to dismiss the warning, no further indication is present to convey to the user that the conflict is still present. Furthermore, should a user elect to correct the conflict upon receiving notification, the user is required to navigate independently in the program to the position in the program that contains the cause of the conflict, which is both inefficient and costly.

SUMMARY OF THE DISCLOSURE

A method and system for handling real-time identification and notification of resource scheduling conflicts is described. In one embodiment, the claimed method works concurrently with a resource scheduling process to indicate to the user in an unobtrusive manner that a resource conflict has occurred. The user, upon selecting the indication of an error, is provided with a description of the conflict and the option of suppressing or resolving the resource conflict. In another embodiment the indication is represented by a visual depiction of a stoplight located at the lower right corner of the display. The colors red and yellow are used to depict unsuppressed and suppressed conflicts respectively. One skilled in the art will recognize that the identification and notification of the conflict may be through any number of media including but not limited to visual, aural, or tactile means.

If the user elects to resolve the resource conflict, one embodiment provides a hyperlink utilizing ordinary Hypertext Markup Language ("HTML") to link the user to the corresponding portion of the scheduling process where the conflict exists. Furthermore, should the user elect to use the hyperlink to access the appropriate page, the entry that is creating the conflict is highlighted for ease of identification. Once the conflict has been resolved, the real-time indication, in this embodiment the stoplight, will revert to a green light indicating that no resource conflicts exists. Conversely if the user elects to suppress the conflict the red light will change to yellow and remain illuminated until the suppressed conflict is resolved. Should a new conflict arise, both the red light and the yellow light will illuminate indicating that suppressed as well as unsuppressed resource conflicts exist. Throughout these indications of conflicts the functionality of the scheduling process remains unaffected and the user is unimpeded should he or she decide to ignore the conflict indication.

DETAILED DESCRIPTION

A system and method for real-time handling of error identification and notification in complex environments, such as call centers, are described. In the description that follows, numerous specific details are set forth in order to provide a thorough understanding of the present invention. It will be evident, however, to one skilled in the art that the method and system presented may be practiced without these specific details.

Figure 1:
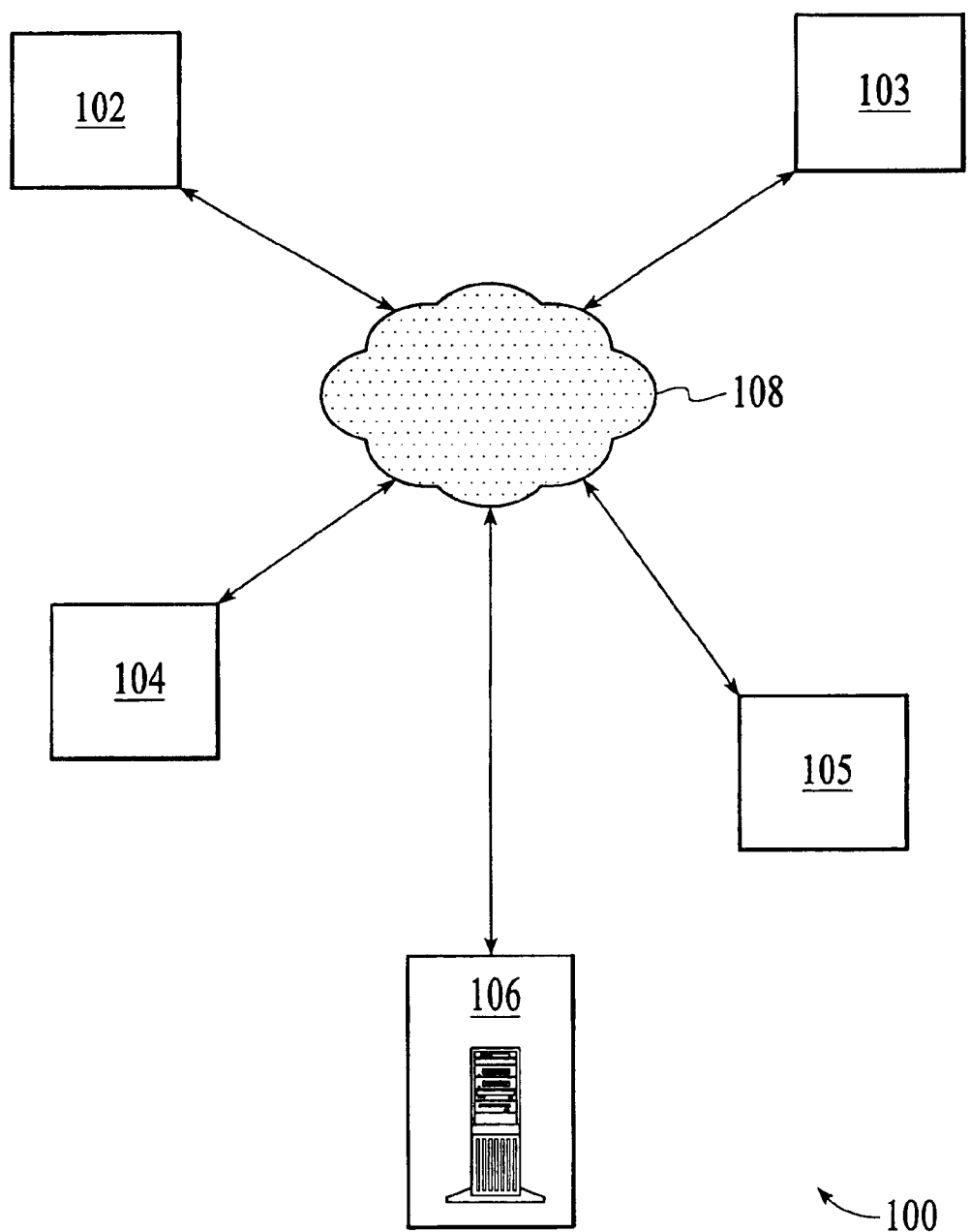
FIG. 1 is a block diagram of an embodiment of a network system for real-time resource scheduling error identification.

FIG. 1 is an embodiment of a system, 100, for providing a real-time identification and notification of resource scheduling conflicts. The system includes multiple client computers, 102–105, which are coupled to the server, 106, through a network, 108. The network, 108, can be any network, such as a local area network, a wide area network, or the Internet. The client computers each include one or more processors and one or more storage devices. Each of the client computers also includes a display device, and one or more input devices. All of the storage devices store various data and software programs. In one embodiment, the method for providing a real-time indication of resource conflicts in a resource scheduling process is carried out on the system, 100, by software instructions executing on one or more of the client computers, 102–105. The software instructions may be stored on the server, 106, or on any one of the client computers. For example, one embodiment presents a hosted application used by a call center of an enterprise that requires complex scheduling of many employees. The software instructions are stored on the server and accessed through the network by a client computer operator of the enterprise. In other embodiments, the software instructions may be stored and executed on the client computer. A user of the client computer with the help of a user interface can enter data required for the execution of the software instructions. Data required for the execution of the software instructions can also be accessed via the network and can be stored anywhere on the network.

One embodiment of a method for providing a real-time identification of resource conflicts during a scheduling process can be used in the call center environment. A call center is an organization that answers and responds to telephone calls from customers for one or more particular organizations. Call centers also respond to other customer contacts, such as e-mail, faxes, voice over Internet protocol, and web chat. Such centers possess a plurality of resources. A resource can be the equipment, the employees, the facilities, or any other asset that facilitates the business in achieving its purpose. In a call center the individual employees answering the calls are agents and each possesses a particular skill set. Each employee is therefore an example of a resource with specialized skills. For example one agent may be able to respond to technical problems, another may specialize in billing questions and still another may specialize in taking product orders. Each agent likely possesses multiple skill sets and a call center manager's challenge is to optimize the agents' schedules so as to maximize the utilization of these skill sets without compromising the functionality of the center, thus minimizing cost.

As the call center schedule is developed, minor modifications in an employee's availability schedule or the call center's resource requirements can require the entire schedule to be regenerated. Numerous working parameters and employee criteria are established to ensure the profitability and efficiency of day to day operations. Considerations such as the maximum number of hours worked per pay period per employee, the maximum period of work without a break, or the necessity for at least two experienced call agents to be on call at any one time are examples of such criteria and parameters. In one embodiment of the present method, as a scheduler inputs changes into a working schedule, a real-time indication is presented to the user if the alteration in the schedule affects a parameter or criteria adversely and will impair the overall functionality of the schedule.

Real-time indications are a result of the scheduling program constantly recalculating the viability of the proposed data into a working schedule. As new data is input the entire schedule is reconfigured and checked for conflicts without any interface or input by the user other than the original entry of the data. The feedback to the user of any conflicts is immediate. For example, an alteration of an agent's ability to maintain a work shift may have dramatic overall affects. Since the agent possesses a certain skill set and the call center must be maintained with a minimum level of skilled individuals, the deletion of the agent's skills from the working schedule may result in the center being understaffed for a particular period. In such a situation the real-time error identification system would present, in one embodiment, a red light depicted as, but not limited to, a stoplight at the bottom of the display to notify the user of the conflict.

The indication would occur as soon as the user altered the employee's schedule. Since the indication of the error is unobtrusive, meaning that the display of the conflict or scheduling problem would not interfere with the normal operation of the scheduling program, the user can continue to alter the schedule as he or she feels fit. Thus, if in this example the user was aware that the alteration of the agent's work schedule would present a problem but has already envisioned a resolution of the conflict, the user need not waste time by having to interact with warning system needlessly. Upon seeing the indication of a conflict, the user could input the potential solution and see if the red light is removed indicating the conflict has been resolved thus validating the envisioned solution.

Likewise, in another embodiment, a user can first become aware of a conflict through the real-time identification system. In this situation if a user alters the schedule, the concurrent identification will unobtrusively notify him or her that a problem exists. The system described in this embodiment does not require the entire form or schedule to be completed before an error is detected. The user in this embodiment can select the identification symbol, the red light in this case, and be presented with a new window containing a description of the conflict as well as a proposed solution. The user can then elect to suppress or ignore the conflict resulting in the illumination of a yellow light in the stoplight depiction or select a hyperlink located within the description that will open the primary scheduling process window centered on the functional area containing the conflict. The window containing the conflict will further have the entry causing the problem highlighted for easy recognition. With the conflict resolved, the new window can be closed and the original scheduling process continued without the presence of an error indication.

If the user elects to suppress the conflict, the yellow light indication will remain illuminated until the conflict is resolved. The suppression of the conflict does not impede the real-time identification of other conflicts. If an additional conflict is identified, a new red light indication is displayed in conjunction with the yellow light indicating a new conflict as well the multiple warnings or conflicts that are suppressed. Selection of the conflict identification will, in this embodiment, present not only descriptions and potential solutions of the current conflict but of the suppressed conflicts as well. Further, if multiple conflicts exist that are not suppressed, selecting the red light will list all of the conflicts for the user's review. The resolution of the resource conflict removes the scheduling error and cancels any indication present. This can be accomplished by following advice given in the resolution window or by disregarding the potential solution and inputting a different change that will alleviate the conflict.

An additional embodiment provides the user with a means to associate a conflict with a particular resource and provides a real-time indication of that association to the user. As with the previous embodiments, the identification and handling of resource conflicts occurs concurrently with the primary scheduling process. Once a conflict occurs, an indication of the conflict is presented to the user in such a manner as to not interfere with his or her use of the application. In addition to the real-time communication of a problem, this embodiment provides a method wherein the specific resource associated with or causing the conflict is readily identified to the user.

In one embodiment, a visual indication or symbol is placed next to the resource that is associated with a conflict. Furthermore, this method of identification can differentiate the type of conflicts associated with each resource. If, for example, the conflict is rule based such as exceeding the maximum number of hours worked per week, this embodiment conveys this information to user without interrupting the scheduling process by placing a symbol next to the resource. Likewise if a conflict is due to a scheduled meeting or similar calendar event, the method can similarly communicate such information to the user without disrupting the normal operation of the scheduling process. In one embodiment the method places a visual indication such as an exclamation mark or any other form of visual symbol next to the conflicted resource and alters the color of the exclamation mark based on the type of conflict. Likewise the indication could be aural or any other similar medium to communicate the identification of a conflict to the user. If, in this embodiment, the exclamation mark is blue the conflict associated with that employee rises from a rule problem whereas if the exclamation mark is red the problem is based in a conflict with a meeting or other calendar events. These and other depictions are described in the following diagrams.

Figure 2:
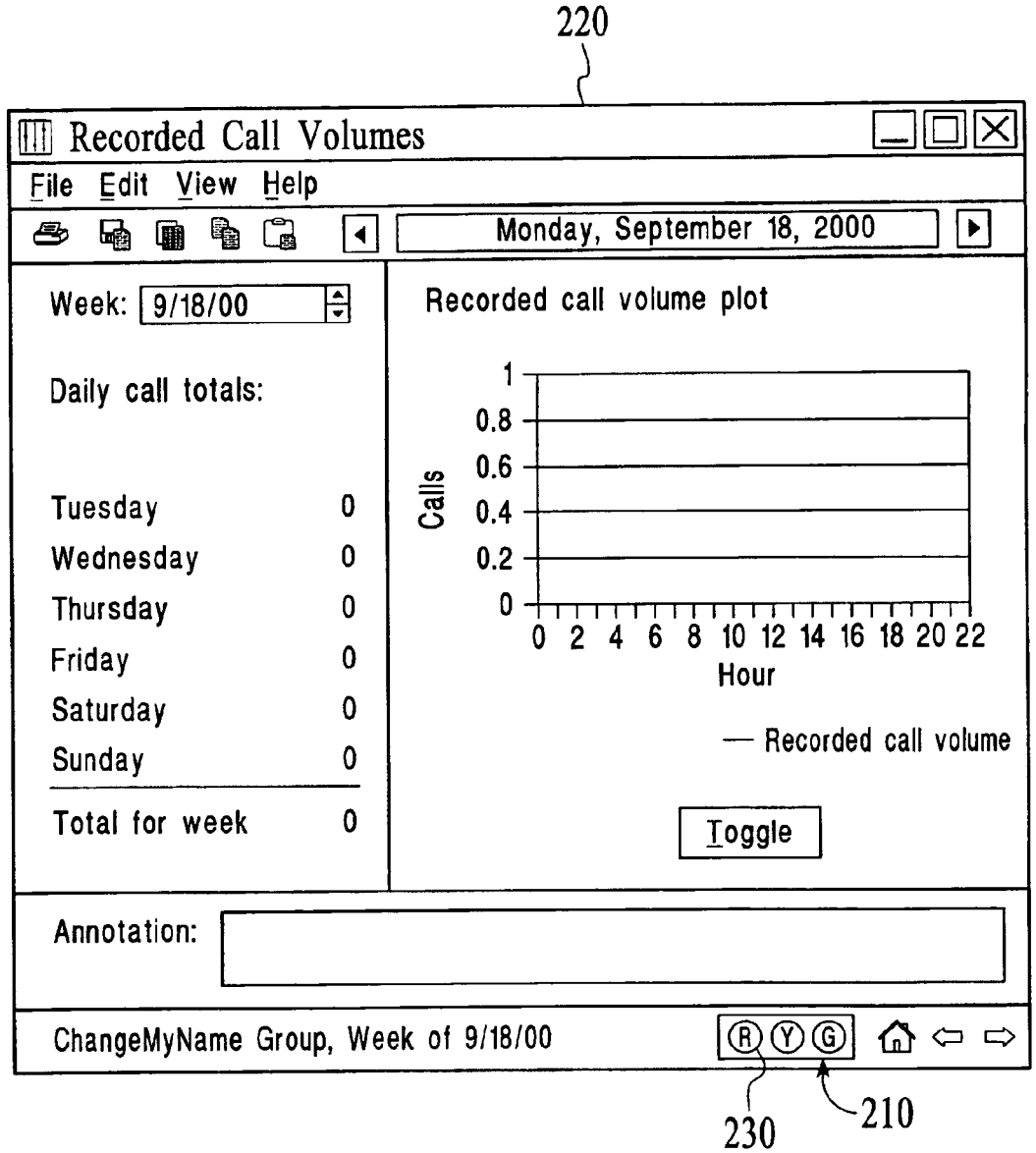
FIG. 2 is a depiction of an embodiment for real-time resource scheduling error identification showing a conflict situation.
Figure 3:
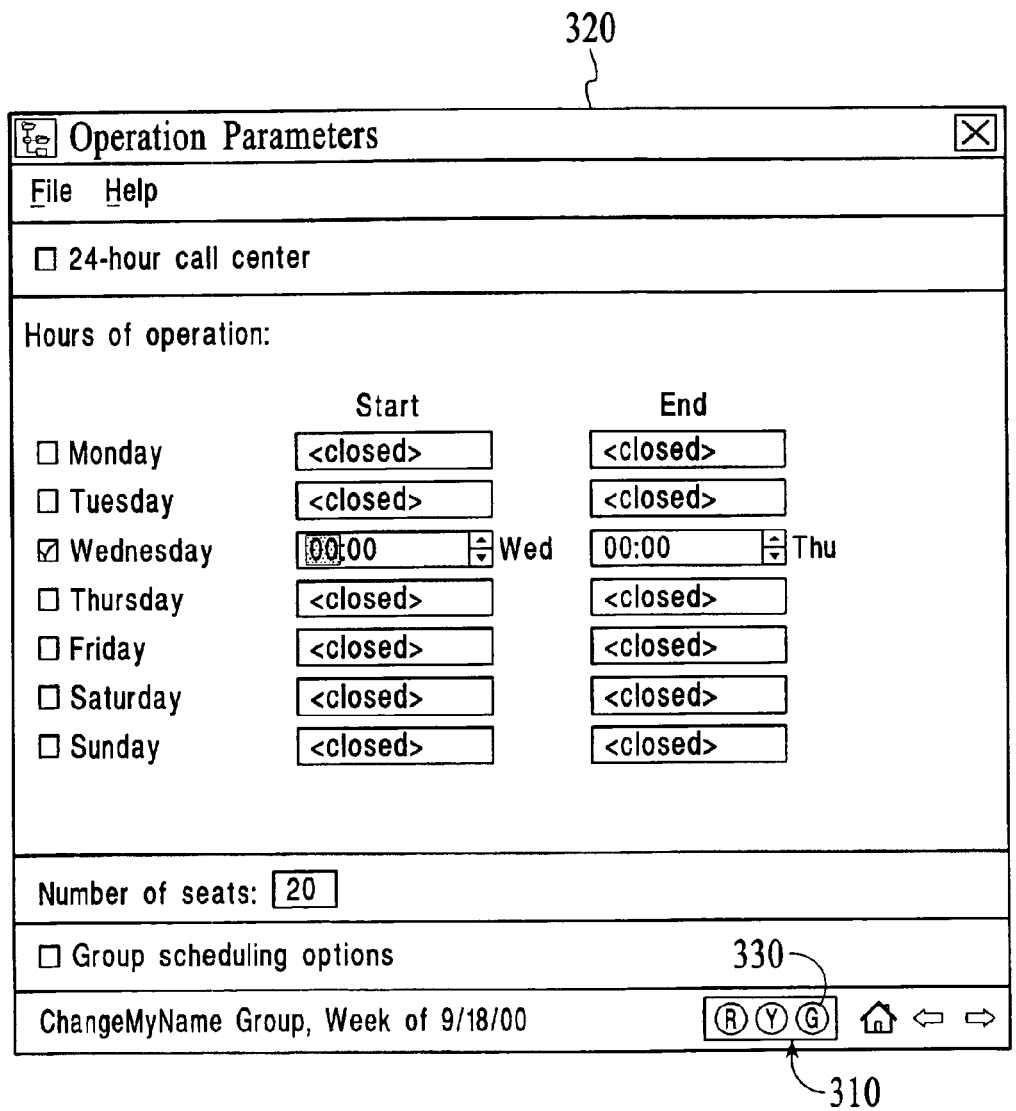
FIG. 3 is a depiction of an embodiment for real-time resource scheduling error identification showing a situation with no resource conflicts.

FIG. 2 is a depiction of a Recorded Call Volumes page, 220, of an embodiment for real-time identification and notification of resource conflicts. In this embodiment the depiction of a stoplight, 210, presents an indication of a resource conflict to the user. Here, the stoplight can be found in the lower rightmost corner of the window with the left, 230, red light illuminated indicating that a conflict exists. The stoplight, or any other suitable depiction to convey the existence of a resource conflict, can be located at a plurality of locations on the window. The stoplight in this embodiment is configured as a single row of lights in a horizontal orientation near the navigation and home icons located in lower right hand corner of the window. The stoplight depicts a conventional configuration of a traffic signal with a red light being the furthermost left light, the green light being furthermost to the right, and a yellow light in the center. FIG. 3 is depiction of an Operations Parameters page, 320, of an embodiment for identification and notification of resource conflicts where no conflicts exist. This window possesses a similar stoplight, 310, as described above which is also located in the lower right corner. In this embodiment the stoplight has the far right, 330, green light illuminated indicating to the user that no resource conflicts are present. In either of these embodiments using a stoplight pictogram for indicating a resource conflict, the center light, if illuminated, would be yellow and would indicate that a conflict or multiple conflicts have been suppressed by the user.

Figure 4:
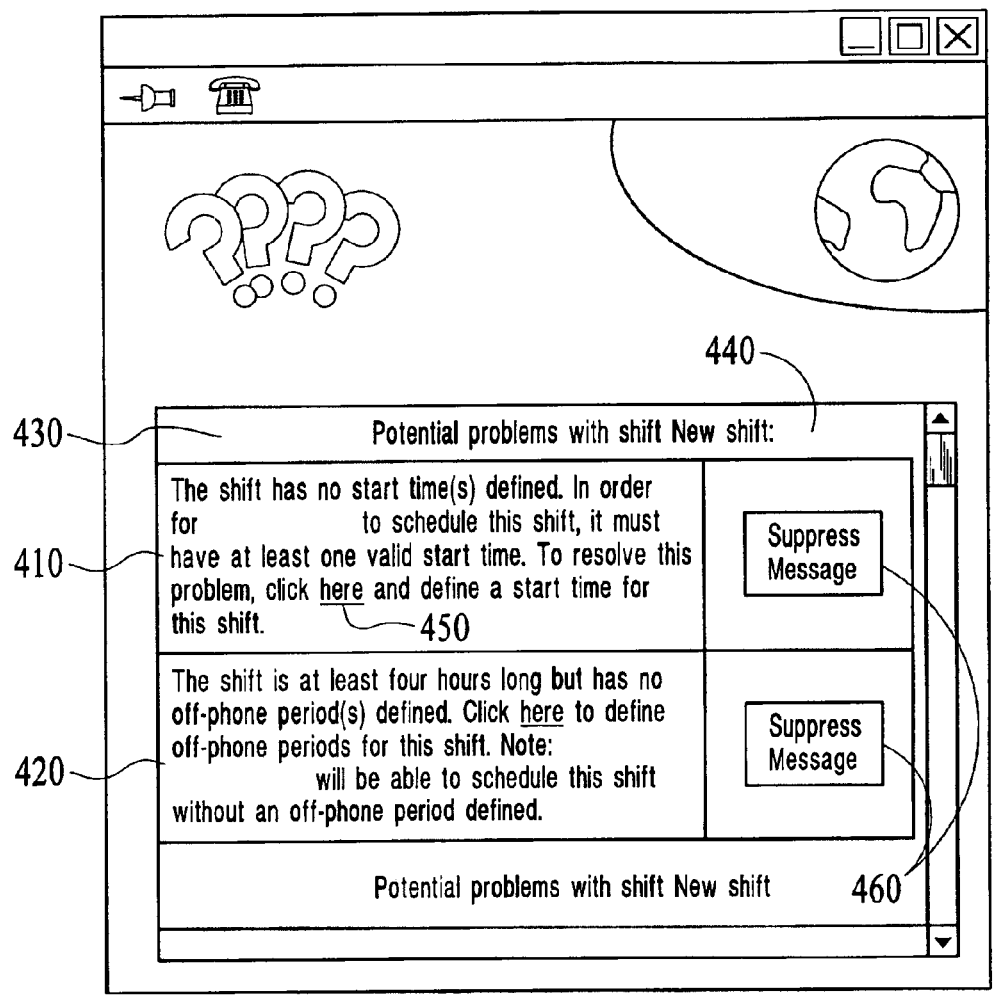
FIG. 4 is a depiction of an embodiment for real-time resource scheduling error identification showing a conflict description and resolution window.

FIG. 4 depicts the resolution window of one embodiment of a method for real-time identification of resource scheduling conflicts. This window appears after an indication of a conflict has been presented to the user, such as a red light illustrated above, and the user has clicked on the light to view the potential solution in an effort to resolve the conflict. The window in FIG. 4 indicates that there are multiple conflicts to be resolved, 410 and 420. The error identification program identifies and informs the user of the location of the potential problem on the top line, 430. In this embodiment the conflict has been found in a shift named "New Shift," 440. The method has determined that New Shift does not have a start time and is in violation of a program rule. The window offers a solution to the conflict by stating that New Shift must have at least one valid start time. Furthermore, this embodiment presents a hyperlink, 450, to the location in the scheduling program where correct start times should be input. If the user selects the hyperlink "here," 450, the program will open a window where the user can define a start time thus resolving the conflict. The new window will highlight the area that must be altered to resolve the conflict. Also depicted in FIG. 4 are two suppress buttons, 460, associated with the two displayed conflicts. These buttons allow the user to suppress the current conflicts and illuminate the yellow light in the stoplight pictogram.

Figure 5:
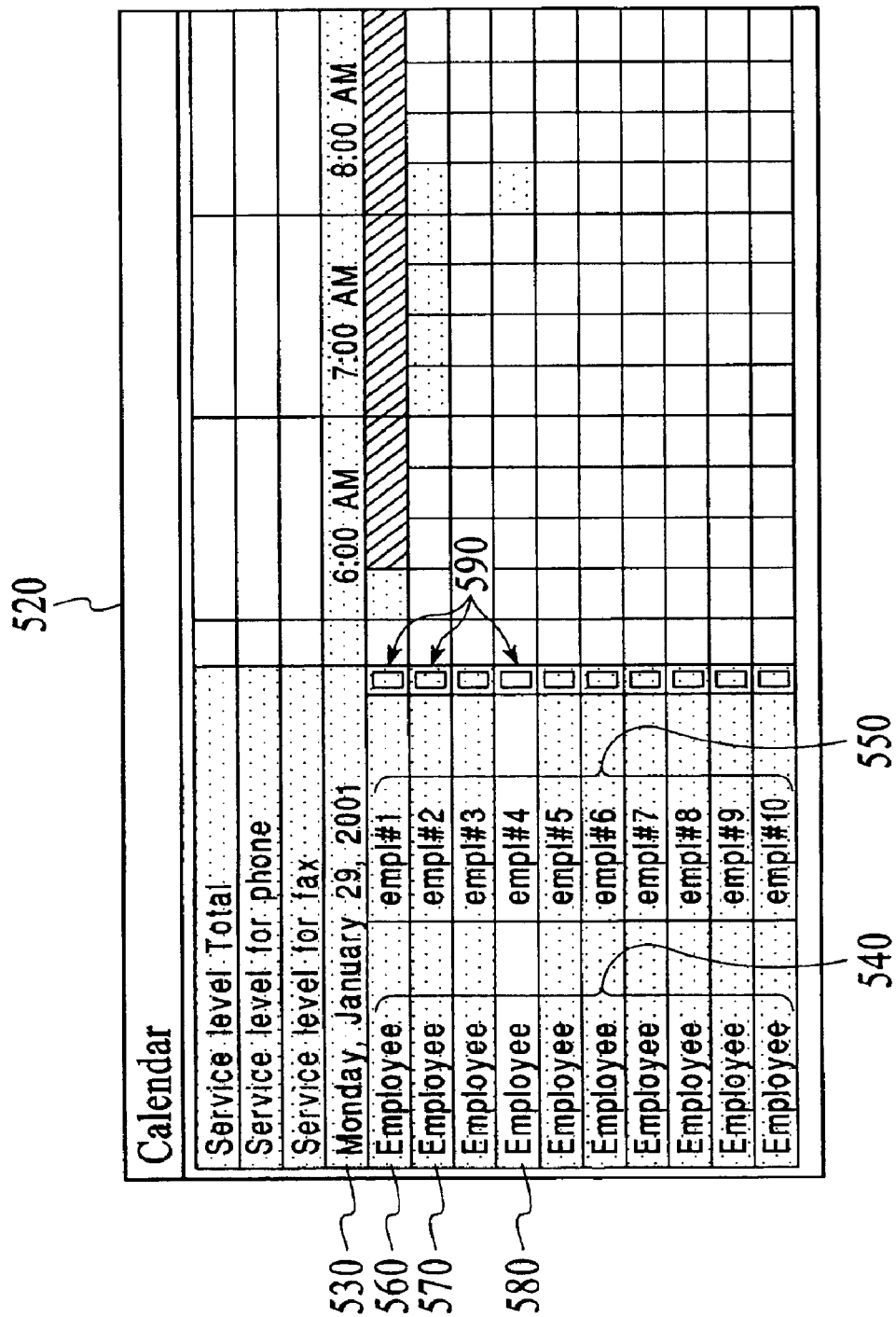
FIG. 5 is a depiction of an embodiment for real-time resource scheduling error identification associated with specific resources.

FIG. 5 is a Calendar page, 520 using one embodiment of a method for identification and notification of resource conflicts where conflicts are associated with specific resources. The depiction shows a schedule calendar for the date Monday, Jan. 29, 2001. Under the date, 530, is a plurality of columns including one categorizing the resource being scheduled as "employee". In the embodiment illustrated in FIG. 5 there are ten resources 540, all of the category "employee". To the right of the category listing is another column that individually identifies each resource. This column contains employee identification numbers 550, which include empl#1 through empl#10, 550. In this embodiment, for the resources identified as empl#1, 560, empl#2, 570, and empl#4, 580, an exclamation mark 590 is located in the column immediately adjacent to the employee identification number. This exclamation mark 590 indicates that there is a resource conflict associated with each of employees 560, 570 and 580.

Figure 6:
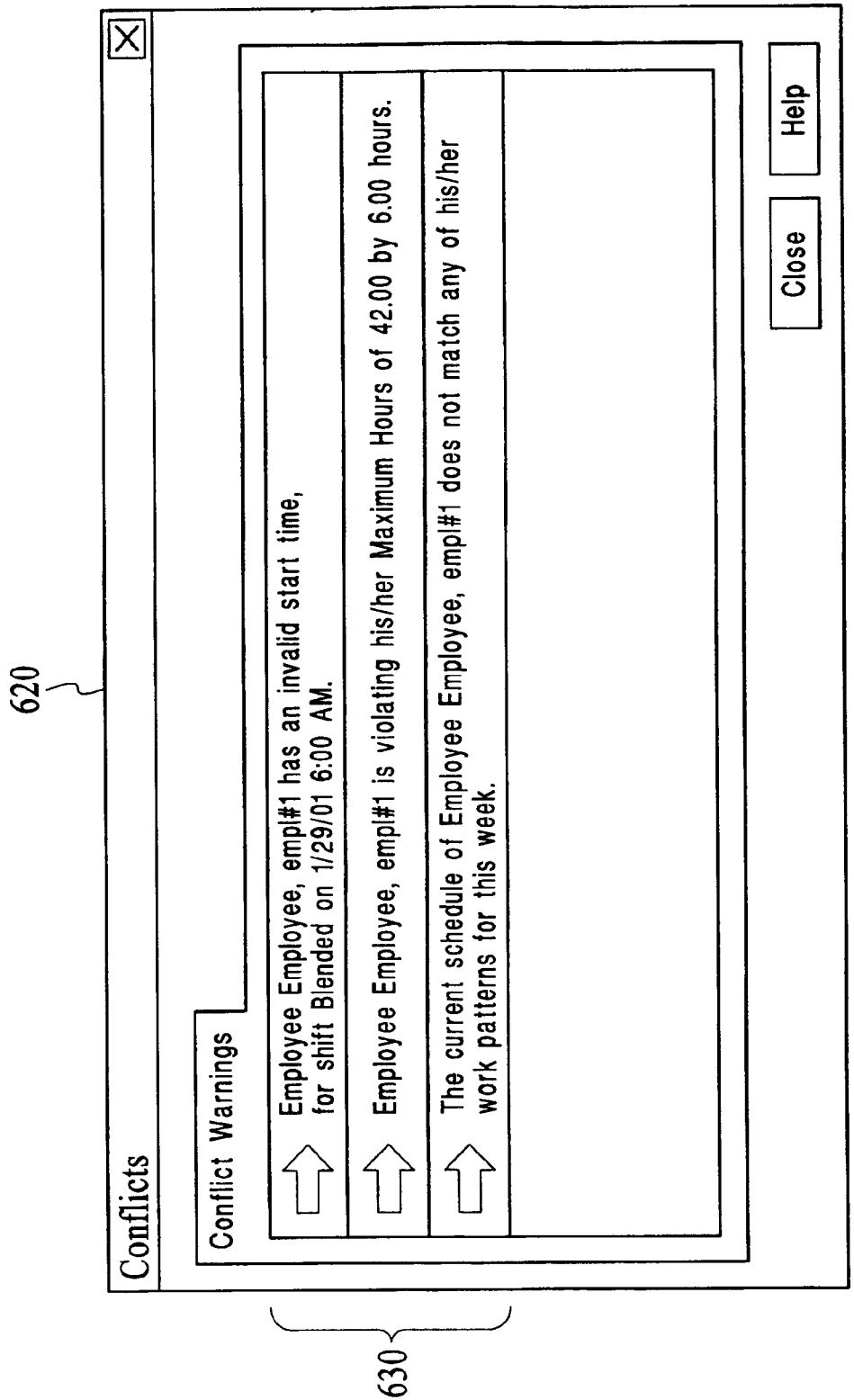
FIG. 6 is a depiction of an embodiment for real-time resource scheduling error identification illustrating a typical list of rule based conflicts associated with a specific resource.

An additional embodiment further allows the user to review all the conflicts associated with a particular resource and individually select which conflicts are to be resolved. FIG. 6 is a Conflicts page, 620, of an embodiment of the method for identification and notification of resource conflicts in which an employee has been associated with a conflict and the user has chosen to review the conflicts. After the user clicks on the associated symbol, a list of conflicts associated with that resource is displayed, 630. In FIG. 6 empl#1 has three rule based conflicts 630.

Figure 7:
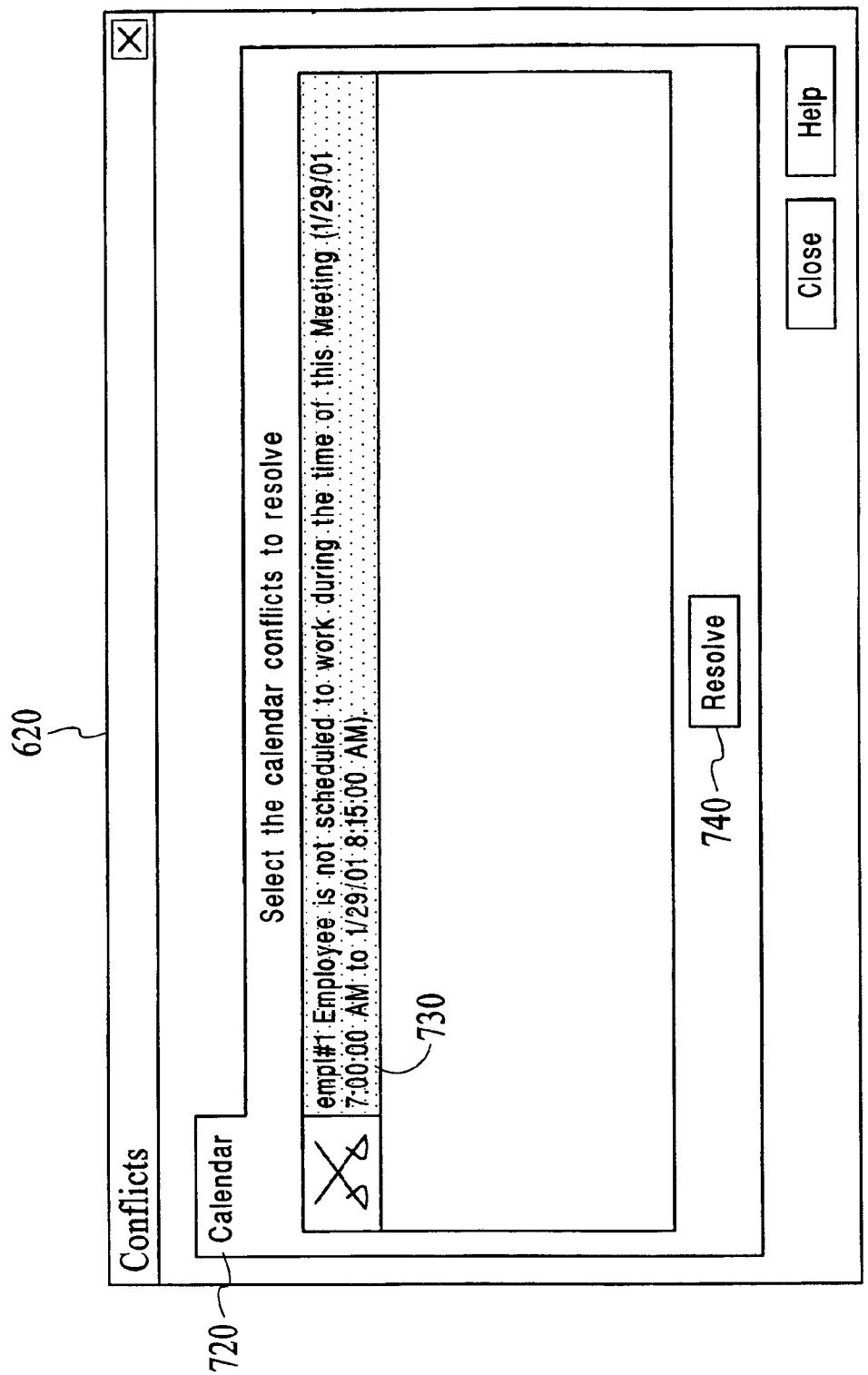
FIG. 7 is a depiction of an embodiment for real-time resource scheduling error identification showing a calendar based conflict associated with a specific resource.

FIG. 7 presents another embodiment including a Calendar page 720. Shown on the Calendar page 720 is a calendar conflict, 730, associated with empl#2. As depicted in FIG. 7, the calendar conflict is resolvable by selecting the button on the bottom of the page, 740. By selecting the resolution button, 740, one embodiment opens a new window on top of the conflict window to offer possible solutions and also to present links to the area of the program where alterations to the resource's utilization can be made.

Figure 8:
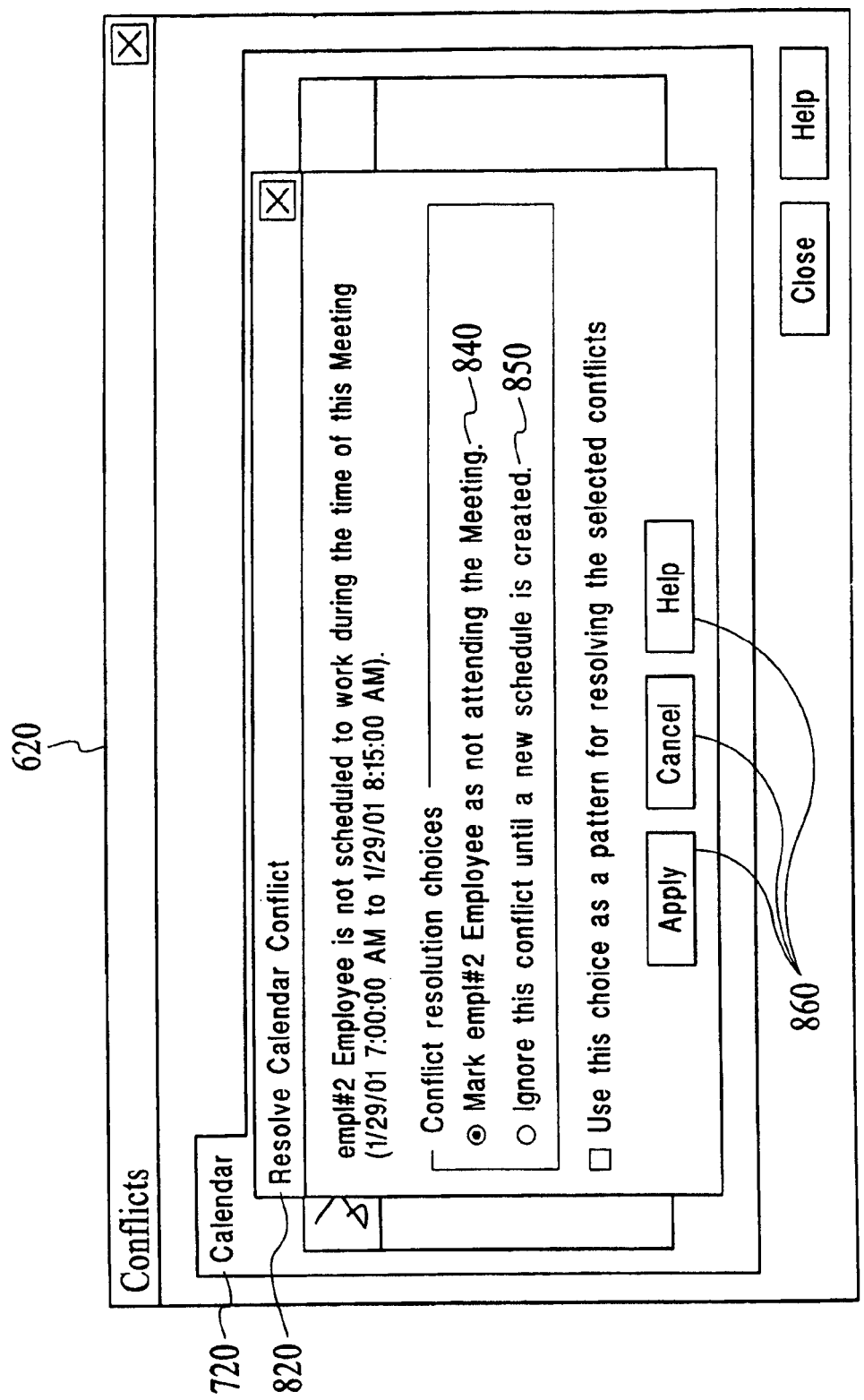
FIG. 8 is a depiction of an embodiment for real-time resource scheduling error identification showing a resolution window associated with a calendar conflict of a specific resource.

FIG. 8 depicts a Resolve Calendar Conflict page, 820, which gives the user an interactive means to correct the conflict. The conflict is repeated to the user, 830, and then, in this embodiment, two resolution choices are presented to the user, 840 and 850. In one embodiment, the user is presented with a solution that marks emlp#2 as not attending the meeting thus removing the calendar conflict, 840. The user may also ignore the conflict until a new schedule is created, 850. Having made a choice, the user than can apply the selection, cancel the resolution process, or seek additional help by using the three interactive "Apply, Cancel, and Help" buttons located at the bottom of the page, 860.

Figure 9:
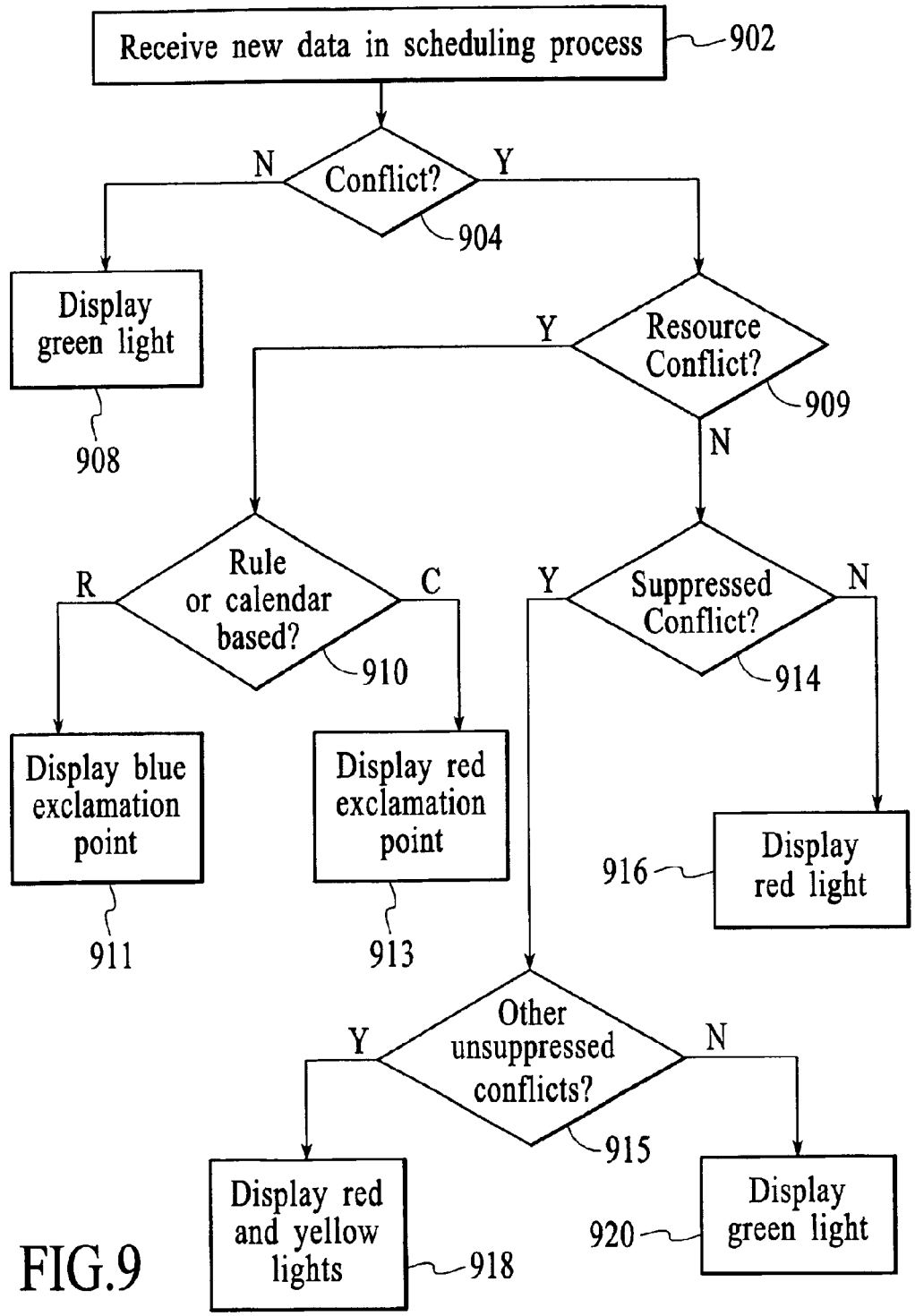
FIG. 9 is a flow diagram illustrating a process of concurrent real-time error identification according to an embodiment.

FIG. 9 is a flow diagram illustrating a process of concurrent real-time error identification according to an embodiment. The process begins at 902 when a user of a scheduling system enters new data. In one embodiment, an error identification method operates within and concurrent with the primary resource scheduling process and analyzes data for any conflicts. While error identification and notification of resource conflicts can operate independently of the primary resource scheduling process, in one embodiment error identification is a part of a primary resource scheduling process.

At 904, it is determined whether a conflict exists, If no conflict exists, a green light is displayed to the user at 908. If a conflict does exist, it is determined at 909 whether the conflict is resource specific, for example, whether the conflict relates to a particular employee. If the conflict is resource specific, it is determined at 910 whether the conflict is rule based or calendar based. If the conflict is rule base, a blue exclamation point is displayed at 911. If the conflict is calendar base, a red exclamation point is displayed at 913.

Referring again to block 909, if it is determined the conflict is not resource specific, it is then determined at 914 whether the conflict has been previously suppressed. If the conflict is suppressed, it is then determined at 915 whether there are other conflicts that are unsuppressed. If there are other conflicts that are unsuppressed, both a red and a yellow light are displayed at 918. If there are no unsuppressed conflicts, a green light is displayed at 920.

Referring again to 914, if the conflict is not suppressed, a red light is displayed at 916.

When a red, green or yellow light is displayed, the user can then click on the light for further information. If the user clicks on the red light, a new window containing an HTML page is generated describing the conflict and suggesting potential solutions. To do this, one embodiment utilizes a warning template file and the Windows registry.

If the user clicks on the yellow indication light, an HTML page is generated describing the suppressed conflict or conflicts and potential solutions. Contained within the new HTML page is a hyperlink that connects the user to the specific window within the primary scheduling resource software where the conflicted resource can be altered. If the user clicks on the hyperlink, one embodiment communicates with the primary resource scheduling software, causing the display of the specific window necessary to modify the data causing the error. Additionally, the data that should be altered is highlighted to facilitate resolving the conflict. If the user elects to suppress the conflict, the conflict is marked appropriately and stored in the Windows registry. If the user elects to un-suppress the conflict, an HTML page is generated based on the new unsuppressed conflict.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A computer implemented method for performing complex resource scheduling of many resources, the method comprising:

providing a real-time indication of resource scheduling conflicts during the computer-implemented method;

analyzing resource scheduling data including real-time detection of resource conflicts, wherein resource conflicts include rule based conflicts and calendar based conflicts;

generating an indication that a resource conflict exists concurrent with the computer-implemented method; and in response to a user input, automatically continuing with the scheduling method without resolving the conflict, including detecting further resource conflicts and generating further indications that resource conflicts exist.

2. The method of claim 1, further comprising presenting to the user, upon selection, a description of the resource conflict.

3. The method of claim 1, wherein presenting includes providing the user the choice to suppress the resource conflict.

4. The method of claim 1, wherein presenting include providing the user a potential resolution of the resource conflict.

5. The method of claim 1, wherein the potential resolution further comprises a hyperlink to a relevant portion of the resource scheduling method allowing the resource conflict to be resolved.

6. The method of claim 1, wherein the indication includes a visual representation.

7. The method of claim 6, wherein the visual representation includes using colors to represent resource conflicts, including red to represent unsuppressed resource conflicts and yellow to represent suppressed resource conflicts.

8. A system for providing real-time indication of resource scheduling conflicts in a resource scheduling process, the system comprising:

a user interface receiving data from a user;

a processor coupled to the user interface, wherein the processor is capable of executing instructions;

a display device coupled to the processor; and a memory device coupled to the processor, the memory device storing instructions comprising a resource scheduling software application for performing complex scheduling of many resources, the application comprising, a resource scheduling process, wherein the resource scheduling process includes, analyzing agent data, analyzing scheduling criteria, and detecting resource conflicts; and an error identification process, wherein the error identification process is concurrent with the resource scheduling process, and wherein descriptions of identified resource conflicts and potential resolutions of the identified resource conflicts are conveyed to the user concurrent with the resource scheduling process, and wherein the resource scheduling process is configured such that normal operation of the scheduling process is independent of resolution of any conflicts.

9. The system of claim 8, wherein the potential resolutions of the identified resource conflicts-include hyperlinks to relevant portions of the resource scheduling process allowing the resource conflict to be resolved.

10. The system of claim 8 wherein the real-time indication includes a visual representation.

11. The system of claim 10 wherein the visual representation includes using a first color for an unsuppressed resource conflict and a second color for a suppressed resource conflict.

12. A computer-readable medium containing executable instructions which, when executed in a processing system, cause the system to:
   analyze resource scheduling data via a resource scheduling process and detect a resource conflict;
   convey unobtrusively to a user an indication that the resource conflict exists concurrently with the resource scheduling process; and
   present to the user, upon selecting the indication, a description of the resource conflict and a potential solution to resolve the conflict, wherein the user may elect to continue normal operation of the resource scheduling process without resolving any conflicts, including conveying to the user indications that at least one further conflict exists.

13. The computer-readable medium of claim 12, wherein the executable instruction, when executed, further allow the user to suppress the resource conflict wherein suppressing comprises allowing the resource scheduling process to continue while the resource conflict persists.

14. The computer-readable medium of claim 12, wherein the executable instruction, when executed, present a hyperlink to a relevant portion of the resource scheduling process where the resource conflict is resolved.

15. The computer-readable medium of claim 12, wherein the indication includes a visual representation.

16. The computer-readable medium of claim 15, wherein visual representation includes using a first color for an unsuppressed resource conflict and a second color for a suppressed resource conflict.

17. A system for providing real-time identification of resource scheduling conflicts, the system comprising:
   at least one server comprising at least one storage device storing executable instructions;
   at least one client processor coupled to the server through a network, wherein the instructions, when executed, cause the at least one client processor to,
   analyze agent data and scheduling criteria to detect a resource conflict;
   concurrently convey an identification of the resource conflict;
   present, upon selection, a description of the resource conflict;
   present a potential solution to resolve the resource conflict; and
   generate a resource schedule in the presence of unresolved conflicts, including detecting further conflicts.

18. The system of claim 17, wherein the instructions include providing the user the choice to suppress the resource conflict.

19. The system of claim 17, wherein the potential solution comprises a hyperlink to a relevant portion of the resource scheduling process allowing the resource conflict to be resolved.

20. The system of claim 17, wherein the indication include a visual representation.

21. The system of claim 20, wherein the visual representation includes using a first color for an unsuppressed conflict and a second color for a suppressed conflict.

22. A method for providing real-time identification of resource scheduling conflicts in a computer program for performing complex scheduling of a plurality of resources, the method:
   analyzing resource scheduling data via a resource scheduling process including real-time detection of resource conflicts;
   providing a real-time indication of resource scheduling conflicts during execution of the computer program, including a visual indication;
   receiving a user input to suppress the resource conflict, wherein the visual indication of the resource conflict uses a first color for unsuppressed resource conflicts and a second color for suppressed resource conflicts, and wherein suppression of the resource conflict allows the computer program to continue executing to generate a complex schedule with at least one unresolved conflict;
   presenting to the user a description of the resource conflict and a potential solution to resolve the resource conflict, wherein the potential solution includes a hyperlink to a relevant portion of the resource scheduling process allowing the resource scheduling conflict to be resolved.

23. A method for providing real-time identifications of resource scheduling conflicts in a computer program for automatically generating complex resource schedules, the method comprising:
   analyzing resource scheduling data including real-time detection of resource conflicts;
   conveying unobtrusively to a user an indication that a resource conflict exists, wherein the conveying of the indication of the resource conflict occurs concurrently with the resource scheduling process and wherein the indication of a resource conflict includes identifying at least one resource associated with the resource conflict; and
   presenting to the user a description of the resource conflict and a potential resolution of the resource conflict, wherein the potential solution includes a hyperlink to a relevant portion of the resource scheduling process allowing the resource scheduling conflict to be resolved;
   if no input is received in response to the indication, continuing with generating the complex schedule, wherein the complex schedule includes the conflict.

24. The method of claim 23, wherein presenting includes providing the user a choice to suppress the resource conflict.

25. The method of claim 23, wherein presenting includes providing the user a choice of viewing the description of the resource conflict.

26. The method of claim 23, wherein the potential solution further comprises a hyperlink to a relevant portion of the resource scheduling process allowing the resource scheduling conflict to be resolved.

27. The method of claim 23, wherein conveying an indication includes a visual representation.

28. The method of claim 27, wherein the visual representation includes a first color for an unsuppressed resource conflict and a second color for a suppressed resource conflict.

29. The method of claim 23, wherein the resource conflicts include conflict of multiple different types, and wherein identifying includes indicating a type of a resource conflict.

30. The method of claim 29, wherein the multiple different types include a rule-based conflict and a calendar based conflict.

31. The method of claim 30 wherein the multiple different types are visually represented including using a third color for a rule-based conflict and a fourth color for a calendar based conflict.

32. A method for generating a resource schedule including concurrent error identification, the method comprising:

receiving scheduling data in a resource scheduling process, including receiving data input by a user;

determining whether a conflict exists on the basis of the received data, including determining whether a conflict is a resource specific conflict;

determining whether a resource specific conflict is rule based or calendar based;

presenting the user with the option to view additional information about a conflict; and presenting the user with the option to suppress a conflict, wherein suppressing a conflict comprises saving information related to the conflict and generating the resource schedule including the unresolved conflict.

33. The method of claim 32, further comprising presenting the user with a hyperlink to a location in a resource scheduling process at which a determined conflict may be resolved by the user.

* * * * *